(12) United States Patent
Baker

(10) Patent No.: US 8,874,158 B2
(45) Date of Patent: Oct. 28, 2014

(54) STATION COMPRISING AT LEAST TWO TRANSMIT ANTENNAS, AND A METHOD OF TRANSMITTING THEREFROM

(75) Inventor: Matthew P. J. Baker, Kent (GB)

(73) Assignee: Alcatel Lucent, Boulogne-Billancourt (FR)

(*) Notice: Subject to any disclaimer, the term of this patent is extended or adjusted under 35 U.S.C. 154(b) by 270 days.

(21) Appl. No.: 13/380,387

(22) PCT Filed: Jun. 4, 2010

(86) PCT No.: PCT/EP2010/003633
§ 371 (c)(1),
(2), (4) Date: Mar. 8, 2012

(87) PCT Pub. No.: WO2010/149306
PCT Pub. Date: Dec. 29, 2010

(65) Prior Publication Data
US 2012/0157148 A1    Jun. 21, 2012

(30) Foreign Application Priority Data

Jun. 23, 2009    (EP) .................................... 09290481
Dec. 15, 2009    (EP) .................................... 09015516

(51) Int. Cl.
*H04B 7/06* (2006.01)

(52) U.S. Cl.
CPC ............ *H04B 7/0691* (2013.01); *H04B 7/0602* (2013.01)
USPC ........ 455/517; 455/11.1; 455/90.1; 455/90.2; 455/90.3; 455/403

(58) Field of Classification Search
CPC .............................. H04H 60/33; H04W 84/00
USPC .......................................................... 455/517
See application file for complete search history.

(56) References Cited

U.S. PATENT DOCUMENTS

| 6,104,710 | A  | * | 8/2000 | Miyashita ...................... 370/350 |
| 6,295,005 | B1 | * | 9/2001 | Ootsuki ......................... 340/7.2 |
| 6,898,441 | B1 |   | 5/2005 | Kogiantis et al. |
| 7,062,295 | B2 | * | 6/2006 | Yoshii et al. ............... 455/562.1 |

(Continued)

FOREIGN PATENT DOCUMENTS

| JP | 9-312868 | 12/1997 |
| JP | 2003-174455 | 6/2003 |

(Continued)

OTHER PUBLICATIONS

Alcatel-Lucent, "Transmit Diversity Solutions for F-DPCH," $3^{rd}$ Generation Partnership Project (3GPP), 3GPP TSG RAN WG1 Meeting #58,R1-093337, 3 pages, XP050388119, Shenzhen, China, Aug. 24-28, 2009.

(Continued)

Primary Examiner — Hai V Nguyen
(74) Attorney, Agent, or Firm — Fay Sharpe LLP

(57) ABSTRACT

A method is provided of transmitting a plurality of signals from a primary station to a respective plurality of secondary stations, said primary station comprising at least two transmit antennas, wherein each of said plurality of signals is transmitted from a respective subset of said at least two transmit antennas to a respective secondary station, in which each subset is selected at least according to a predetermined characteristic of the respective secondary station.

12 Claims, 7 Drawing Sheets

(56) References Cited

U.S. PATENT DOCUMENTS

| | | | |
|---|---|---|---|
| 7,206,577 B2* | 4/2007 | Peltola | 455/435.2 |
| 7,356,089 B2* | 4/2008 | Jia et al. | 375/267 |
| 7,408,907 B2* | 8/2008 | Diener | 370/338 |
| 7,447,502 B2* | 11/2008 | Buckley et al. | 455/434 |
| 7,710,950 B2* | 5/2010 | Buckley et al. | 370/354 |
| 7,751,352 B2* | 7/2010 | Seo et al. | 370/310 |
| 7,760,712 B2* | 7/2010 | Buckley | 370/353 |
| 7,853,217 B2* | 12/2010 | Yoshii et al. | 455/67.11 |
| 7,916,681 B2* | 3/2011 | Andersson et al. | 370/318 |
| 8,200,229 B2* | 6/2012 | Kaikkonen et al. | 455/442 |
| 8,243,660 B2* | 8/2012 | Jeong et al. | 370/329 |
| 8,295,779 B2* | 10/2012 | Cave et al. | 455/69 |
| 8,331,426 B2* | 12/2012 | Yang et al. | 375/219 |
| 8,358,614 B2* | 1/2013 | Pani et al. | 370/328 |
| 8,400,935 B2* | 3/2013 | Pelletier et al. | 370/252 |
| 8,457,647 B2* | 6/2013 | Tynderfeldt et al. | 455/450 |
| 8,484,530 B2* | 7/2013 | Stewart et al. | 714/758 |
| 8,559,982 B2* | 10/2013 | Wu et al. | 455/456.5 |
| 8,660,086 B2* | 2/2014 | Bazzo et al. | 370/331 |
| 2004/0248618 A1* | 12/2004 | Yoshii et al. | 455/562.1 |
| 2005/0053169 A1 | 3/2005 | Jia et al. | |
| 2005/0265225 A1 | 12/2005 | Mahadevappa et al. | |
| 2006/0246907 A1* | 11/2006 | Kaikkonen et al. | 455/442 |
| 2006/0276227 A1* | 12/2006 | Dravida | 455/562.1 |
| 2007/0135166 A1* | 6/2007 | Ding et al. | 455/561 |
| 2007/0253368 A1* | 11/2007 | Zhang et al. | 370/329 |
| 2007/0293224 A1* | 12/2007 | Wang et al. | 455/436 |
| 2008/0004058 A1* | 1/2008 | Jeong et al. | 455/517 |
| 2008/0063116 A1* | 3/2008 | Yokoyama | 375/299 |
| 2008/0181177 A1* | 7/2008 | Flore et al. | 370/331 |
| 2009/0067345 A1* | 3/2009 | Sakamoto et al. | 370/254 |
| 2010/0113004 A1* | 5/2010 | Cave et al. | 455/422.1 |
| 2010/0157895 A1* | 6/2010 | Pani et al. | 370/328 |
| 2010/0246516 A1* | 9/2010 | Pelletier et al. | 370/329 |
| 2011/0111790 A1* | 5/2011 | Andersson et al. | 455/522 |
| 2011/0158205 A1* | 6/2011 | Niemasz et al. | 370/336 |
| 2011/0249767 A1* | 10/2011 | Chen et al. | 375/295 |
| 2013/0155984 A1* | 6/2013 | Marinier et al. | 370/329 |
| 2013/0203419 A1* | 8/2013 | Siomina et al. | 455/437 |
| 2013/0235834 A1* | 9/2013 | Tynderfeldt et al. | 370/329 |

FOREIGN PATENT DOCUMENTS

| | | |
|---|---|---|
| JP | 2004-23716 | 1/2004 |
| JP | 2009-65555 | 3/2009 |
| WO | WO 2008135975 A2 * | 11/2008 |

OTHER PUBLICATIONS

"Universal Mobile Telecommunications System (UMTS); Physical Channels and Mapping of Transport Channels onto Physical Channels (FDD) (3GPP TS 25.211 version 8.4.0 Release 8)," ETSI TS 125 211 V8.4.0, 58 pages, XP014043960, Mar. 1, 2009.

International Search Report for PCT/EP2010/003633 dated Feb. 4, 2011.

* cited by examiner

STATION COMPRISING AT LEAST TWO TRANSMIT ANTENNAS, AND A METHOD OF TRANSMITTING THEREFROM

FIELD OF THE INVENTION

The present invention relates to telecommunications, in particular to wireless telecommunications.

DESCRIPTION OF THE RELATED ART

In known multiple-antenna transmission systems, such as those using transmit diversity and many multiple-input multiple-output (MIMO) schemes, transmission power is shared approximately equally between the transmit antennas, in order to enable a balanced pair of power amplifiers to be used and equally loaded.

However, in some circumstances transmission of a signal from two antennas can have detrimental consequences due to destructive interference. An example of such a situation occurs with the transmission of a signal known as the Fractional Dedicated Physical Channel (F-DPCH) in the Wideband CDMA (WCDMA) system defined by the 3$^{rd}$ Generation Partnership Project (3GPP), see in particular 3GPP Technical Specification 25.211, Version 8.5.0, Section 5.3.2.6. The F-DPCH consists of a single symbol of information (constituting a transmitter power control (TPC) command) transmitted at regular intervals. Each individual TPC command can take a different value. It is therefore not possible to apply known Space-Time Block Code (STBC) transmit diversity techniques to this channel, as STBC techniques require pairs of symbols on which to operate. Consequently in current versions of the WCDMA specifications, the same F-DPCH symbol is defined to be transmitted from both antennas simultaneously. This ensures that the transmission power is balanced between the antennas, but has the drawback that destructive interference will occur at some locations (although constructive interference will be experienced at others). This means that a mobile user terminal in some locations will experience very poor signal to noise ratio (SNR) for the F-DPCH, possibly even losing synchronisation, as the synchronisation criterion is defined with reference to the quality of the Fractional Dedicated Physical Channel (F-DPCH) in WCDMA.

Some other transmit diversity schemes do not suffer from this problem, such as closed loop schemes which adapt the phase of the transmissions from at least one antenna dynamically. However, such schemes require feedback which increases complexity and may not work well when the coherence time of the radio channel is short.

SUMMARY

The reader is referred to the appended independent claims. Some preferred features are laid out in the dependent claims.

An example of the present invention is a method for transmitting a plurality of signals from a primary station to a respective plurality of secondary stations, said primary station comprising at least two transmit antennas, wherein each of said plurality of signals is transmitted from a subset of said at least two transmit antennas, in which said subset is selected at least according to a predetermined characteristic of the respective secondary station.

In some embodiments, the primary station is a base station and the secondary stations are user terminals.

In some embodiments, the problem of destructive interference is avoided by transmitting each F-DPCH to an individual user terminal from a different respective single antenna. In some embodiments the different F-DPCHs are assigned substantially equally to the different antennas in order to maintain a balance of transmission power.

The inventor realized that in some embodiments each user terminal's F-DPCH is assigned to a corresponding antenna deterministically based on a known characteristic of the user terminal.

This approach has advantages over an alternative proposal of using explicit signalling to indicate which antenna is assigned to each user terminal (to enable each user terminal to know which phase reference to use to demodulate the signal) because such additional signalling would add complexity and overhead.

The present invention also relates to corresponding apparatus.

BRIEF DESCRIPTION OF THE DRAWINGS

Embodiments of the present invention will now be described by way of example and with reference to the drawings, in which.

DETAILED DESCRIPTION

Figure 1:
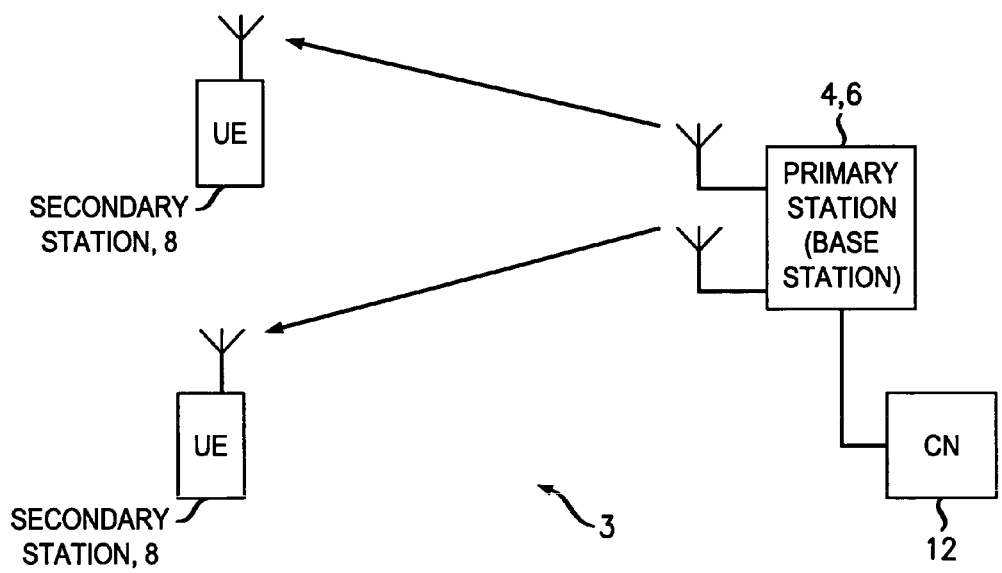
FIG. 1 is a diagram illustrating a radio access network according to a first embodiment of the invention.

As shown in FIG. 1, an example radio access network 3 includes a primary station 4, namely a wireless telecommunications base station 6, and user terminals 8, two of which are shown for simplicity. A base station is sometimes referred to as a NodeB. A user terminal is sometimes referred to as a User Equipment, denoted "UE". The base station 6 has two antennas 10 for radio communications with the user terminals 8. The base station is also connected to a core network 12.

Figure 2:
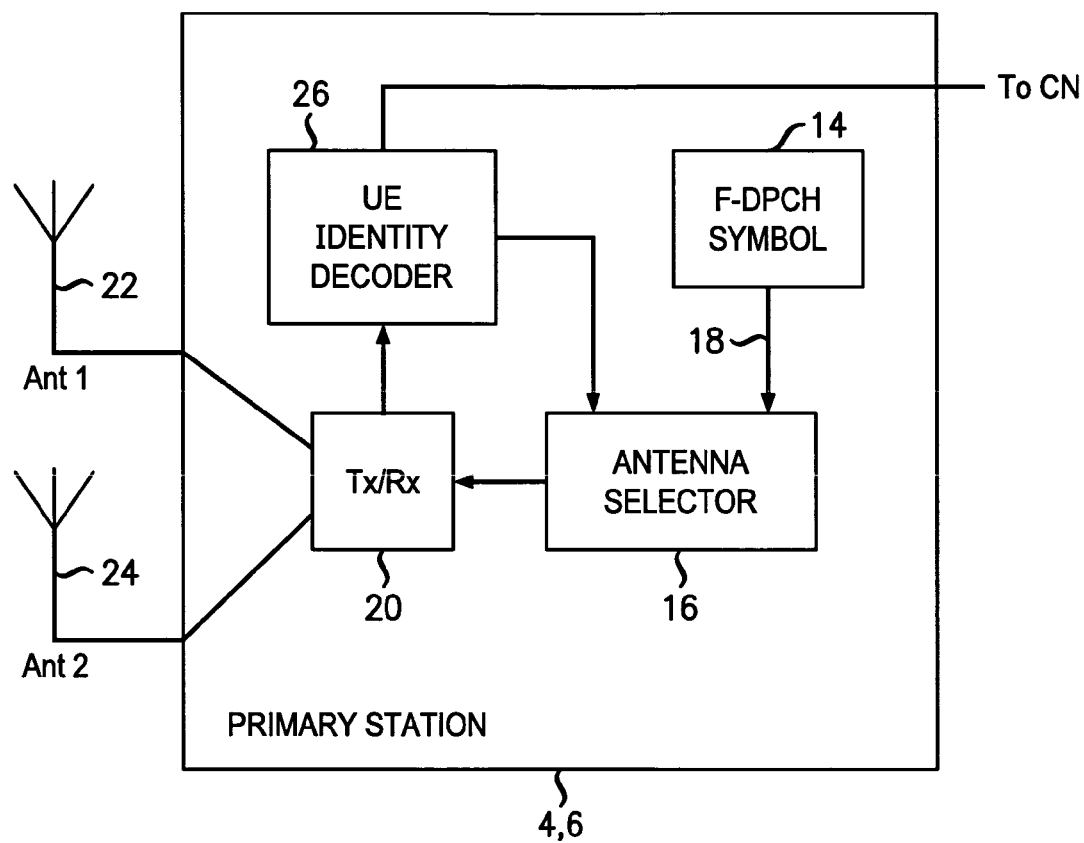
FIG. 2 is a diagram illustrating in further detail the base station shown in FIG. 1.

As shown in FIG. 2, the base station includes a Fractional Dedicated Physical Channel (F-DPCH) symbol generator 14 that is connected to an antenna selector 16. The selector includes an input 18 from the F-DPCH generator 14. The antenna selector 16 is also connected to a transmitter-receiver 20 which is itself connected to two antennas 22,24, respectively denoted Ant1 and Ant2.

In use, a UE identity decoder 26 decodes a user terminal identifier in a signal received from a user terminal (or from the core network), and forwards that decoded identifier to the antenna selector 16.

In this example, the user terminal identifier is its Cell Radio Network Temporary Identifier (C-RNTI). In another otherwise similar example, the user terminal identifier is the International Mobile Equipment Identifier (IMEI).

An example of how the base station 12 operates in selecting which antenna to use for transmitting the F-DPCH symbols will now be described. User terminals with an odd value of the identifier have their F-DPCH symbols assigned to the first transmit antenna of the base station while user terminals with an even value of the said identifier have their F-DPCH symbols assigned to the second antenna. This approach will now be explained in more detail with reference to FIG. 3.

Figure 3:
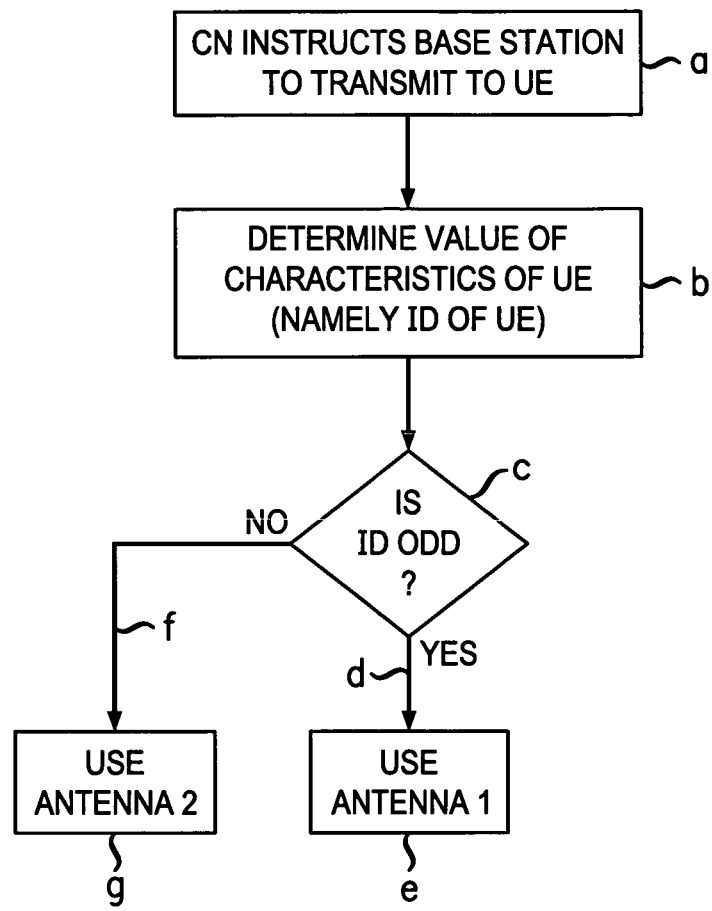
FIG. 3 is a flowchart illustrating operation of the base station shown in FIG. 2.

As shown in FIG. 3, the core network 12 instructs (step a) the base station 6 to transmit a F-DPCH symbol to the particular user terminal. The base station then determines (step b) the characteristic of the user terminal, namely its C-RNTI which is a user terminal identifier, from signals received from the user terminal (or core network). The antenna selector 16 then selects the antenna by determining (step c) whether the identifier (which is a numerical) is odd (as opposed to even). If yes (step d) then the first antenna (Ant1) is selected (step e). Conversely, if no (step f), then the second antenna (Ant2) is selected (step g).

In this example, it can be considered that the identifying number of the antenna to be used for the transmission to a particular user terminal is given by (ID mod N)+1 where ID is the identifier of the user terminal and N is the total number of antennas available for transmission at the base station. ID mod N is the integer remainder of integer division of ID by N. In this two antenna example, N=2 and the identifying number (1 or 2) of the antenna to be used to a user terminal is given by (ID mod N)+1. Accordingly, in this example if the user terminal ID is odd then Ant2 is selected, but if the user terminal ID is even then Ant1 is selected.

On average, and particularly where large numbers of user terminals are present, such a mechanism ensures that the transmission power is divided approximately equally between the antennas.

As regards reception by user terminals of Fractional Dedicated Physical Channel (F-DPCH) symbols transmitted from the base station, each user terminal knows its own identifier a priori and therefore calculates, in similar fashion, which of the antennas of the base station, the base station will use for downlink transmission of F-DPCH symbol to that user terminal. Accordingly, the user terminal uses the phase reference expected in respect of that antenna in demodulating of the F-DPCH symbol.

Also Using Time in Antenna Selection

Figure 4:
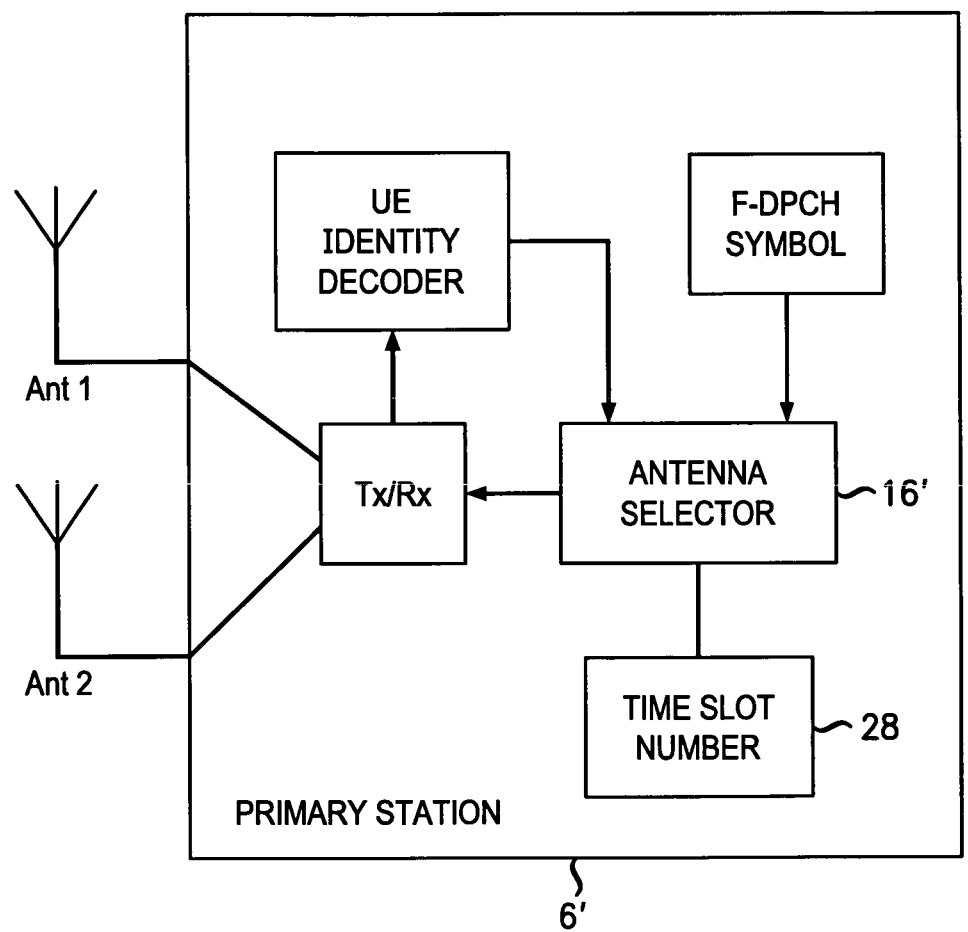
FIG. 4 is a diagram illustrating a base station according to a second embodiment of the invention.

In another embodiment, antennas can be selected in a time-dependent manner. For example, as shown in FIG. 4, in an otherwise similar embodiment to that described above, time slot number 28 at which transmission will occur is used as additional input to the antenna selector 16'.

For example, the antenna number is then given by ((ID+TSN)mod N)+1 where TSN is the timeslot number in which the transmission occurs. As previously, mentioned, ID is the identifier of the user terminal and N is the total number of antennas available for transmission at the base station.

This additional input causes the transmission to a particular user terminal to switch systematically across the antennas over time, enabling some switched antenna diversity to be achieved. In the case of the F-DPCH symbols, this would not improve the reliability of any one individual Transmit Power Control (TPC) command, but it would have the advantage of improving the reliability on average, and therefore helping to avoid the user terminal losing synchronisation.

Figure 5:
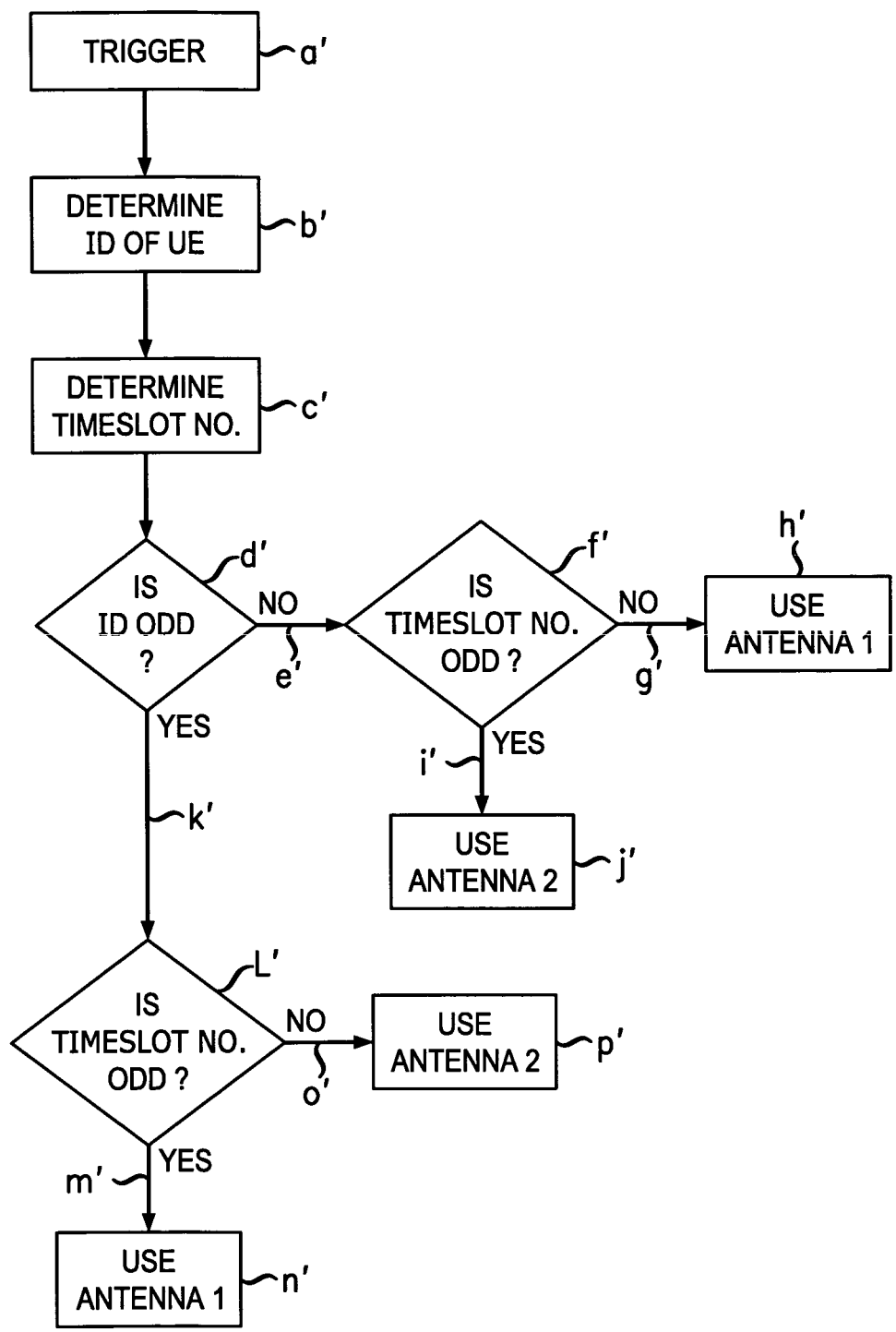
FIG. 5 is a flowchart illustrating operation of the base station shown in FIG. 4.

As shown in FIG. 5, the core network 12 instructs (step a') the base station 6' to transmit a F-DPCH symbol to the particular user terminal. The base station then determines (step b') the characteristic of the user terminal, namely its Cell Radio Network Temporary Identifier (C-RNTI) which is a user terminal identifier, from signals received from the user terminal (or core network). The base station then determines (step c') the time slot number in which the F-DPCH symbol is to be sent.

The antenna selector 16' then selects the antenna as follows. First the antenna selector 16' determines (step d') whether the identifier (which is numerical) is odd (in other words not even). If no (step e'), then the antenna selector determines (step f') whether the time slot number is odd. If the timeslot number is not odd (step g'), the first antenna (Ant1) is selected (step h'). Conversely, if the timeslot number is odd (step i'), then the second antenna (Ant2) is selected (step j').

On the other hand if the determination at step d' is that yes, the identifier is odd (step k'), then the antenna selector determines (step l') whether the time slot number is odd. If yes (step m') then the first antenna (Ant1) is selected (step n'). Conversely, if no (step o'), then the second antenna (Ant2) is selected (step p').

In another alternative embodiment (not shown), frame number is used in place of time slot number.

Using a Pseudo-Random Number in Antenna Selection

In a further embodiment, a pseudo-random number is used in place of the time slot number (TSN), the pseudo-random number being derived from a known or deterministically-derivable sequence available at both the base station and the user terminal. The pseudo-random number may for example be provided by hashing functions, which are a useful family of functions for this purpose.

Figure 6:
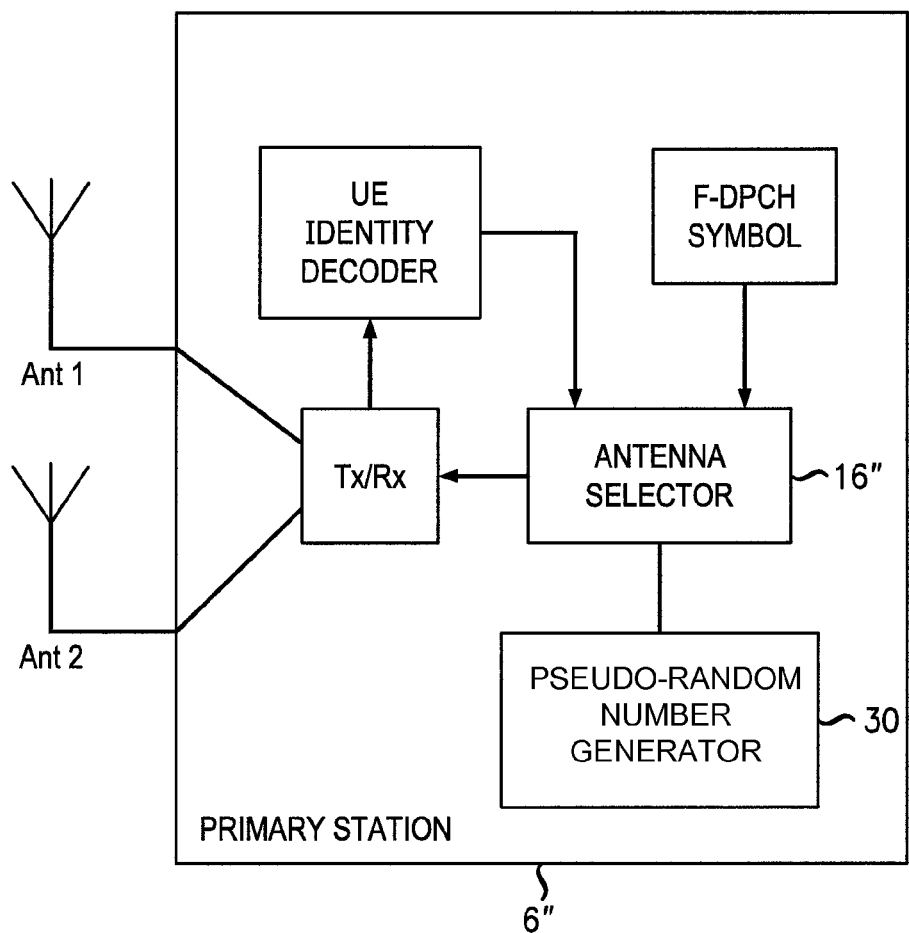
FIG. 6 is a diagram illustrating a base station according to a third embodiment of the invention.

As shown in FIG. 6, in an otherwise similar embodiment to that described in the section above, a pseudo-random number from a pseudo-random number generator 30 is used as the additional input to the antenna selector 16".

For example, the antenna number is then given by ((ID+PRN)mod N)+1 where PRN is the pseudo-random number. As previously mentioned, ID is the identifier of the user terminal and N is the total number of antennas available for transmission at the base station.

Figure 7:
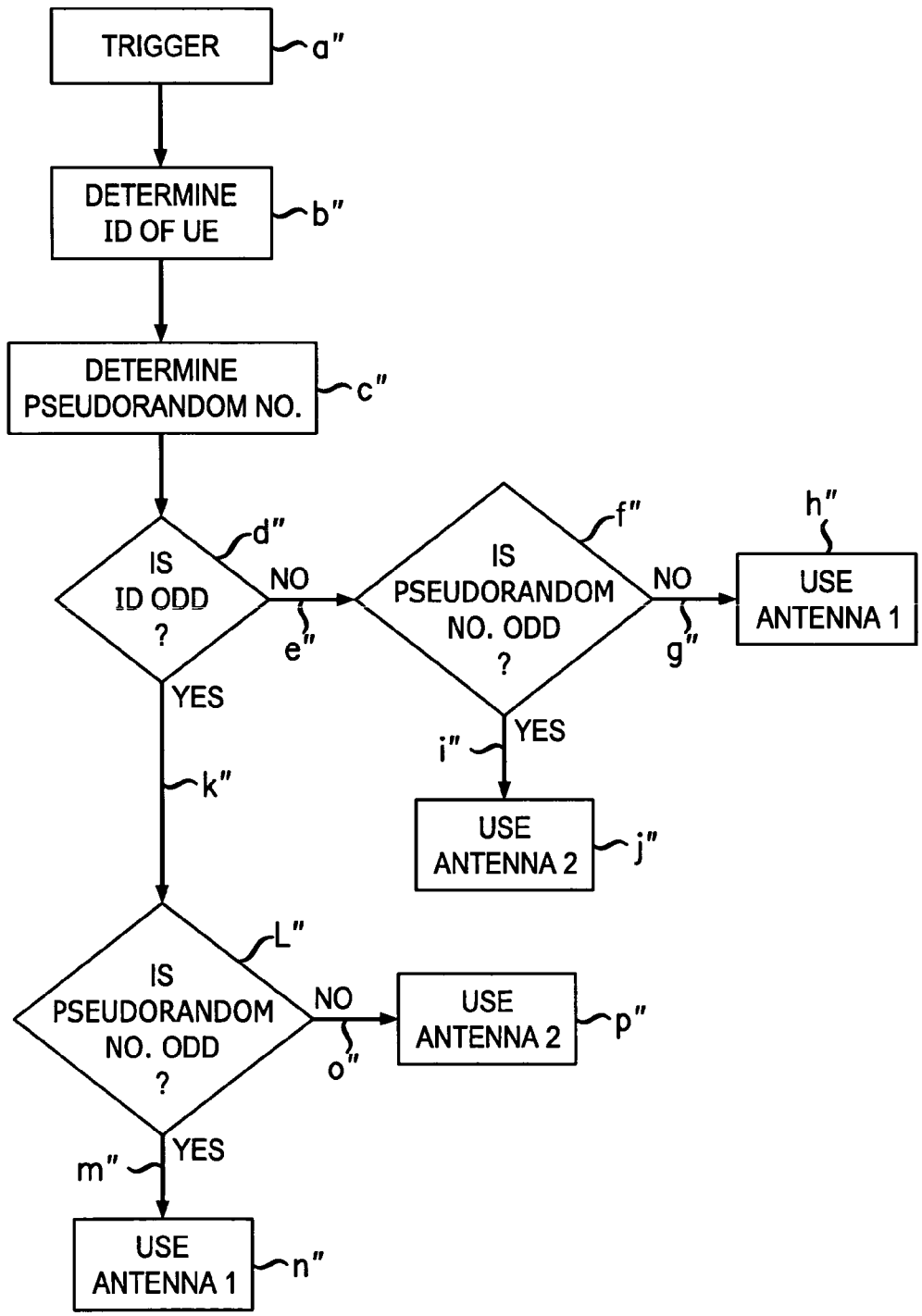
FIG. 7 is a flowchart illustrating operation of the base station shown in FIG. 6.

As shown in FIG. 7, the core network 12 instructs (step a") the base station 6" to transmit a F-DPCH symbol to the particular user terminal. The base station then determines (step b") the characteristic of the user terminal, namely its C-RNTI which is a user terminal identifier, from signals received from the user terminal (or core network). The base station then determines (step c") the pseudo-random number generated in respect of the F-DPCH symbol to be sent. The antenna selector 16" then selects the antenna as follows. First the antenna selector 16' determines (step d") whether the identifier (which is a numerical) is odd (as opposed to even). If no (step e") then the antenna selector determines (step f') whether the pseudo-random number is odd. If no (step g"), the first antenna (Ant1) is selected (step h"). Conversely, if yes (step i"), then the second antenna (Ant2) is selected (step j").

On the other hand if the determination at step d" is that yes, the identifier is odd (step k"), then the antenna selector determines (step l') whether the pseudo-random number is odd. If yes (step m") then the first antenna (Ant1) is selected (step n"). Conversely, if no (step o"), then the second antenna (Ant2) is selected (step p").

Some Other Variants

In the above examples, a user terminal identifier is used as an input to the antenna selector. In some other embodiments some other known characteristic of user terminals is used to differentiate between them.

In some of the specific examples, the base station has just two antennas (N=2). In some other embodiments, the total number N of antennas available for transmission at the base station may be larger, e.g. 3, 4, 5 . . . . The number of the antenna used for the transmission to a particular user terminal may be given by (ID mod N)+1 where ID is the identifier of the user terminal and N is 3, 4, 5 . . . .

In the above examples, the primary base station is a base station and the secondary stations are user terminals. In some embodiments, the primary station can be a user terminal and the secondary stations can be base stations.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of transmitting from a primary station a plurality of signals to a corresponding plurality of secondary stations, said primary station comprising at least two transmit antennas, wherein each of said plurality of signals is transmitted from a respective subset of said at least two transmit antennas to a respective secondary station, in which each subset is selected dependent upon a predetermined characteristic of the respective secondary station, wherein said predetermined characteristic is an identifier of the secondary station.

2. A method according to claim 1, wherein each transmit antenna is identified by a corresponding number, and the number of the transmit antenna used for the transmission of a signal is given by (ID mod N)+1 where ID is the identifier of the respective secondary station and N is the total number of antennas available for transmission at the primary station.

3. A method according to claim 1, in which the primary station comprises just two transmit antennas, and each of the plurality of signals is transmitted by a respective single transmit antenna.

4. A method according to claim 1, in which the plurality of signals comprise Fractional Dedicated Physical Channel, F-DPCH, symbols.

5. A method according to claim 1, wherein the selection depends also on the time at which the transmission is to occur.

6. A method according to claim 5, wherein the selection depends on the time at which the transmission is to occur in that the selection depends on whether the timeslot number at which a signal is to be sent meets a given criterion.

7. A method according to claim 6, wherein the criterion is whether timeslot number is an odd number.

8. A method according to claim 5, wherein the time is determined by a frame number.

9. A telecommunications primary station configured to transmit by radio a plurality of signals, and comprising a transmitter comprising at least two transmit antennas, said primary station further comprising an antenna selector configured to select for each signal a subset of said at least two transmit antennas to transmit said each signal, wherein for each signal the subset of antennas is selected dependent upon a predetermined characteristic of a secondary station, wherein said predetermined characteristic is an identifier of the secondary station which is intended to receive the signal.

10. A telecommunications primary station according to claim 9, wherein the antenna selector operates such that each transmit antenna is identified by a corresponding number, and the number of the transmit antenna used for the transmission of a signal is given by (ID mod N)+1 where ID is the identifier of the respective secondary station and N is the total number of antennas available for transmission at the primary station.

11. A telecommunications primary station according to claim 9, wherein the antenna selector also receives input data dependent on the time at which the transmission is to occur and is configured to make the selections dependent also upon said input data.

12. A telecommunications secondary station configured to determine from which antenna of a primary station comprising at least two transmit antennas a signal is received, the antenna of the primary station having been selected dependent upon a predetermined characteristic of the secondary station, the secondary station being operative to select for use in demodulation an expected phase reference in respect of the antenna determined, in which the signal comprises an F-DPCH symbol and the predetermined characteristic is an identifier of the secondary station.

* * * * *